United States Patent
Severson

(10) Patent No.: US 8,348,501 B2
(45) Date of Patent: Jan. 8, 2013

(54) THERMAL ICING CONDITIONS DETECTOR

(75) Inventor: John A. Severson, Eagan, MN (US)

(73) Assignee: Rosemount Aerospace, Inc., Burnsville, Minnesota, MN (US)

(*) Notice: Subject to any disclaimer, the term of this patent is extended or adjusted under 35 U.S.C. 154(b) by 0 days.

(21) Appl. No.: 13/192,840

(22) Filed: Jul. 28, 2011

(65) Prior Publication Data

US 2011/0282595 A1    Nov. 17, 2011

Related U.S. Application Data

(62) Division of application No. 12/691,370, filed on Jan. 21, 2010, now Pat. No. 8,182,140, which is a division of application No. 12/174,957, filed on Jul. 17, 2008, now Pat. No. 7,674,036, which is a division of application No. 11/316,187, filed on Dec. 22, 2005, now Pat. No. 7,416,329, which is a division of application No. 10/299,207, filed on Nov. 19, 2002, now Pat. No. 7,014,357.

(51) Int. Cl.
*G01K 13/02*    (2006.01)
*G01N 25/04*    (2006.01)
*B64D 15/00*    (2006.01)

(52) U.S. Cl. ............ 374/16; 374/28; 374/143; 374/164; 374/114; 244/134 R

(58) Field of Classification Search .............. 374/16, 374/27, 28, 45, 141, 142, 143, 160, 164, 374/163, 135, 183, 185, 179, 29, 147, 7, 374/1, 39, 40, 114, 109, 102, 107, 32, 208, 374/138; 73/25.01, 25.04, 29.01, 29.02, 73/335.06, 31.01, 170.02, 170.12; 244/134 R
See application file for complete search history.

(56) References Cited

U.S. PATENT DOCUMENTS

| | | | |
|---|---|---|---|
| 2,552,017 | A | 4/1947 | Schwartz et al. |
| 2,426,625 | A | 9/1947 | Lindberg |
| 2,641,928 | A | 10/1949 | Howell |
| 2,588,840 | A | 3/1952 | Howland |
| 2,650,496 | A | 9/1953 | Middleton et al. |

(Continued)

FOREIGN PATENT DOCUMENTS

GB    674750    7/1952

(Continued)

OTHER PUBLICATIONS

"AiAA-2001-0679 Ludlam Limit Considerations on Cylinder Ice Accretion: Aerodynamics and Thermodynamics," 39th Aerospace Sciences Meeting & Exhibit, Jan. 8-11, 2001.

(Continued)

*Primary Examiner* — Gail Verbitsky
(74) *Attorney, Agent, or Firm* — David C. Bohn; Westman, Champlin & Kelly, P.A.

(57) ABSTRACT

A sensor for detecting icing conditions in an airstream includes a flow housing mounted on an aircraft and in which one or more probes are mounted. At least one of the probes subjected to impingement of the airstream and liquid moisture droplets in such airstream. The heat removal, or cooling effect on the probe in the airstream carrying liquid droplets is determined. A temperature signal indicating the airstream temperature is combined with signals from the at least one probe for determining whether or not icing conditions are present.

20 Claims, 3 Drawing Sheets

U.S. PATENT DOCUMENTS

| | | | |
|---|---|---|---|
| 2,755,456 A | | 7/1956 | Bursack |
| 2,766,619 A | | 10/1956 | Tribus et al. |
| 2,914,755 A | | 11/1959 | Fraser |
| 2,970,475 A | | 2/1961 | Werner |
| 2,996,911 A | | 8/1961 | Obermaier et al. |
| 3,000,213 A | | 9/1961 | Eves et al. |
| 3,057,198 A | | 10/1962 | Crouchman |
| 3,139,751 A | | 7/1964 | Rosenthal et al. |
| 3,164,820 A | | 1/1965 | Hulett |
| 3,171,934 A | * | 3/1965 | Brennan et al. ............... 337/370 |
| 3,201,990 A | | 8/1965 | Wald |
| 3,236,093 A | | 2/1966 | Werner |
| 3,276,254 A | | 10/1966 | Richard |
| 3,287,974 A | | 11/1966 | Ciemochowski |
| 3,305,851 A | | 2/1967 | Brandtszteter |
| 3,422,677 A | | 1/1969 | Lockwood |
| 3,517,900 A | | 6/1970 | Roussel |
| 3,540,826 A | | 11/1970 | Bisberg |
| 3,590,636 A | | 7/1971 | Eddy |
| 3,621,714 A | | 11/1971 | Puccinelli |
| 3,798,971 A | | 3/1974 | Lowrance |
| 3,940,622 A | | 2/1976 | Stallabrass et al. |
| 4,035,644 A | | 7/1977 | Ciemochowski |
| 4,080,821 A | | 3/1978 | Johnston |
| 4,129,993 A | | 12/1978 | Schotten |
| 4,210,021 A | | 7/1980 | Vykhodtsev et al. |
| 4,222,044 A | | 9/1980 | Boschung |
| 4,324,285 A | | 4/1982 | Henderson |
| 4,403,872 A | | 9/1983 | DeLeo |
| 4,432,658 A | | 2/1984 | Harman et al. |
| 4,611,492 A | | 9/1986 | Koosmann |
| 4,774,838 A | | 10/1988 | Rickson et al. |
| 4,808,009 A | | 2/1989 | Sittler et al. |
| 4,882,574 A | | 11/1989 | Khurgin |
| 4,890,494 A | | 1/1990 | Osbond et al. |
| 4,908,599 A | | 3/1990 | Breen et al. |
| 4,980,673 A | | 12/1990 | Kleven |
| 5,003,295 A | | 3/1991 | Kleven |
| 5,043,558 A | | 8/1991 | Byles |
| 5,050,109 A | * | 9/1991 | Ladd .................. 73/76 |
| 5,140,135 A | | 8/1992 | Freeman |
| 5,313,202 A | | 5/1994 | Hansman, Jr. et al. |
| 5,354,015 A | | 10/1994 | Meador |
| 5,575,440 A | | 11/1996 | LeBlond et al. |
| 5,628,565 A | | 5/1997 | Hagen et al. |
| 5,653,538 A | | 8/1997 | Phillips |
| 5,709,470 A | * | 1/1998 | Finley ............... 374/16 |
| 5,763,858 A | | 6/1998 | Jones |
| 5,795,069 A | | 8/1998 | Mattes et al. |
| 6,070,475 A | | 6/2000 | Muehlhausen et al. |
| 6,250,801 B1 | | 6/2001 | Bernard |
| 6,269,320 B1 | | 7/2001 | Otto |
| 6,320,511 B1 | | 11/2001 | Cronin et al. |
| 6,328,467 B1 | | 12/2001 | Keyhani |
| 6,330,986 B1 | | 12/2001 | Rutherford et al. |
| 6,370,450 B1 | | 4/2002 | Kromer et al. |
| 6,419,186 B1 | | 7/2002 | Bachinski et al. |
| 6,452,542 B1 | | 9/2002 | Bachinski et al. |
| 6,516,785 B1 | | 2/2003 | Nakada et al. |
| 6,581,391 B2 | | 6/2003 | Horey et al. |
| 6,609,825 B2 | | 8/2003 | Ice et al. |
| 6,827,485 B2 | | 12/2004 | Isebrand |
| 6,905,242 B2 | | 6/2005 | Heuer et al. |
| 6,941,805 B2 | | 9/2005 | Seidel et al. |
| 7,000,871 B2 | | 2/2006 | Barre et al. |
| 7,014,357 B2 | | 3/2006 | Severson |
| 7,014,359 B2 | | 3/2006 | Suga |
| 7,124,630 B2 | | 10/2006 | Hanson et al. |
| 7,155,968 B2 | | 1/2007 | Collot et al. |
| 7,175,136 B2 | | 2/2007 | Shah et al. |
| 7,191,643 B2 | | 3/2007 | Rasmussen et al. |
| 7,416,329 B2 | | 8/2008 | Severson |
| 7,441,948 B2 | * | 10/2008 | Bernard et al. ............... 374/135 |
| 7,490,510 B2 | | 2/2009 | Agami et al. |
| 7,594,627 B2 | | 9/2009 | Bourgault |
| 7,674,036 B2 | | 3/2010 | Severson |
| 2002/0131474 A1 | | 9/2002 | Suga |
| 2003/0058919 A1 | | 3/2003 | Ice et al. |
| 2004/0095984 A1 | | 5/2004 | Severson |
| 2005/0089082 A1 | | 4/2005 | Anderson et al. |
| 2006/0133447 A1 | | 6/2006 | Severson |
| 2009/0003408 A1 | | 1/2009 | Severson |

FOREIGN PATENT DOCUMENTS

| | | |
|---|---|---|
| GB | 2185110 | 7/1987 |
| GB | 2283315 | 5/1995 |
| WO | 8101331 | 5/1981 |

OTHER PUBLICATIONS

"Aiaa-2001-0398 Certification and Integration Aspects of a Primary Ice Detection System," 39th Aerospace Scienes Meeting and Exhibit, Jan. 8-11, 2001.

"Aerospace Information Report SAE AIR 4367," Issued Apr. 1995, Society of Automotive Engineers Inc.

"Aerospace Standard SAE AS 8181," Issued Aug. 1997, Society of Automotive Engineers Inc.

* cited by examiner $$\frac{P_1}{P_2} = \frac{R_1}{R_2}$$

$R_1 \gg P_1$ $$\frac{R_1}{P_1} \approx \frac{R_3}{P_3} \approx \frac{R_2}{P_2}$$

$$R_3 \gg R_1 \quad R_1 \approx R_2$$

THERMAL ICING CONDITIONS DETECTOR

CROSS-REFERENCE TO RELATED APPLICATIONS

The present application is a divisional of and claims priority of divisional U.S. patent application Ser. No. 12/691,370 filed Jan. 21, 2010, which is a divisional of and claims priority of divisional U.S. patent application Ser. No. 12/174,957 filed Jul. 17, 2008 (now U.S. Pat. No. 7,674,036), which is a divisional of and claims priority of divisional U.S. patent application Ser. No. 11/316,187 filed Dec. 22, 2005 (now U.S. Pat. No. 7,416,329), which is a divisional of and claims priority of parent U.S. patent application Ser. No. 10/299,207 filed Nov. 19, 2002 (now U.S. Pat. No. 7,014,357).

BACKGROUND

The present invention relates to icing conditions detectors or sensors that use temperature sensitive probes, which are connected to sensing circuitry and positioned such that measuring voltage or power characteristics provides information for detecting moisture in a fluid flow, and when combined with an ambient temperature measurement serve to detect icing conditions in the atmosphere.

Emerging regulatory requirements for operating aircraft in icing conditions are being interpreted to require more conservative estimates of sensing icing situations than may be provided with existing ice detectors. Application specific Conditions that conventional accretion based detectors may not be able to detect due to Ludlam Limit effects need to be addressed to meet the new requirements. The ability to detect the existence of icing conditions, rather then actual ice accretion, may therefore be required. "Icing conditions" require the presence of liquid moisture in the airflow, and an air temperature below some selected threshold temperature usually specified to be slightly above freezing.

SUMMARY

In its broadest form, a single temperature sensitive probe is deployed in the airstream, and is a heated sensor. The sensor can be self-heated from the power used to excite the sensing element, or a separate heater integral to the probe. Air data information, from other sources which are sufficient to calculate area normalized mass flow rate are needed. The power consumed by the probe to maintain itself at a selected temperature above ambient in dry air is known to have a fixed relationship to mass flow rate calculated from the other air data sources. The air data information is independent of the presence of moisture, but, moisture in the air will increase the power drawn by the heated probe relative to the dry condition to maintain the selected temperature. Thus, if the power drawn by the probe deviates from the expected dry air relationship, the presence of moisture is indicated. A measurement of temperature of the ambient air is also needed to determine whether icing conditions are present.

This ability to obtain information relating to the power drawn to provide heat to maintain the probe temperature to indicate the presence of icing conditions is also achieved by providing two identical heated temperature sensors or probes at different locations in substantially the same mass airflow, but where liquid water is removed from the airflow at one location. As shown in FIG. 1, a bifurcated flow channel is provided. One branch channel is essentially free of liquid moisture due to inertial separation, and the other branch channel carries the liquid moisture in the airflow.

As shown, a flow housing similar to that used with some total air temperature sensors may be used to provide inertial separation between flow channel branches. A heated or self-heated temperature probe that is in the moisture carrying channel branch will respond differently from a similarly heated temperature probe in the channel that is free of moisture, assuming there is moisture present in the free stream airflow. Assuming the probes are maintained at a fixed temperature, in non-moisture or dry air flow there will be increasing amounts of heat removed from each probe as flow rate increases, but the amount of heat removed from each will be substantially the same.

By connecting the two resistance type probes into a bridge, the bridge output voltage will remain near zero and independent of flow rate or air speed in dry air, but if there is liquid moisture present the heat removed from one of the probes, where removal of heat is enhanced by evaporation and/or blow off of warmed water, will cause a temperature change at that probe and therefore a resistance change if the probe is a resistance type temperature sensor. The offset in voltage would be expected to increase with increasing liquid water content. When an ambient air temperature measurement, that is the temperature of the freestream airflow, is provided from a separate source, a determination of icing conditions can be made. Alternately, a temperature probe may be located in one of the flow channels, preferably that from which moisture has been removed, to approximate the freestream air temperature.

If a resistance temperature probe is used, this approach can be modified by including this probe in a bridge circuit. In this modified approach it is not necessary that mass airflow through each channel be substantially equal. By measuring suitable combinations of voltages, the presence of moisture in the branch carrying liquid moisture from the freestream airflow can be determined because the relationships between the measurements will differ compared to conditions when the free stream flow is dry. Temperature can be determined by measuring the voltage drop across the temperature sensor.

Again, the presence of liquid moisture and an air temperature below a threshold, usually slightly above freezing, is required for icing conditions, and these parameters can be provided by the instrument of the present invention.

DETAILED DESCRIPTION OF ILLUSTRATIVE EMBODIMENTS

Figures 1, 2:
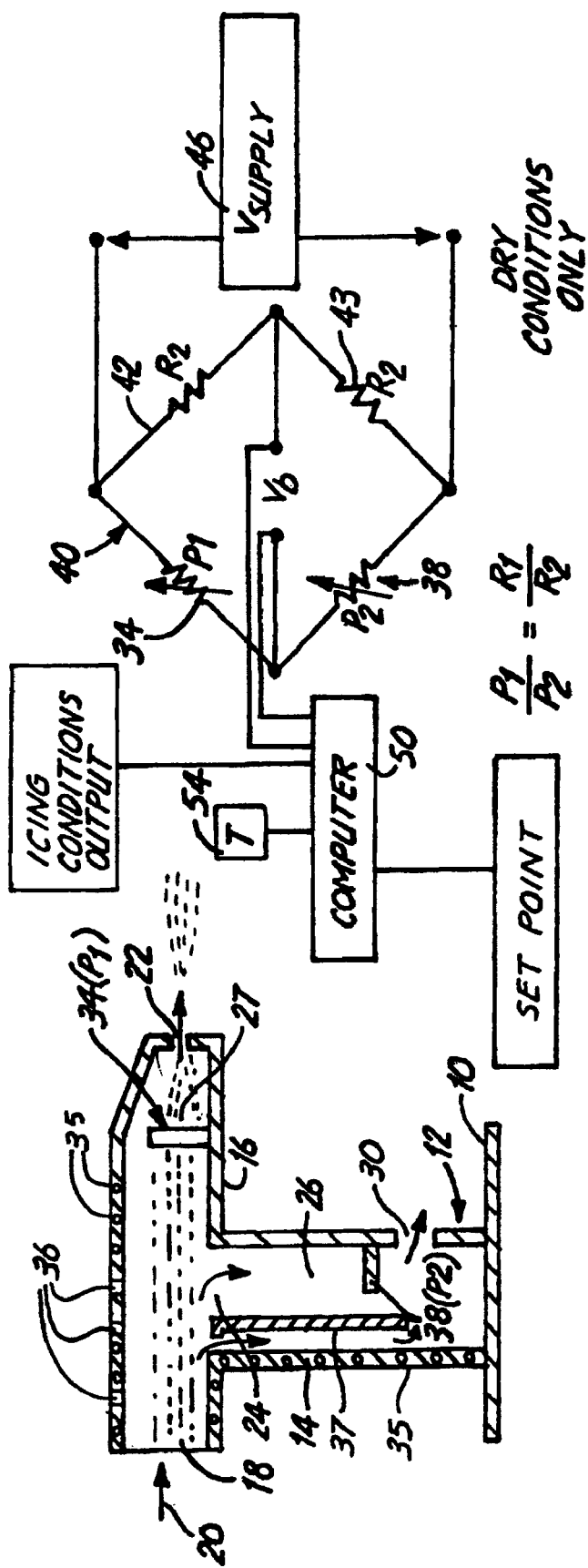
FIG. 1 is a schematic side sectional view through a flow housing that can be mounted onto an aircraft and provides an inlet leading to two branch flow channels, one of which has liquid moisture removed by inertial separation, and illustrating a first form of the invention.
FIG. 2 is a schematic bridge circuit illustrating the operation of the first form of the invention.

In FIG. 1, an aircraft skin 10 supports a flow housing 12 that as shown, has a hollow strut 14 and a fore and aft facing flow tube 16 mounted onto the strut 14. The flow tube 16 can have any desired cross-sectional shape, and is generally rectilinear or shaped like a flattened circle, and has an inlet end flow channel 18 through which freestream air low indicated by the arrow 20 is introduced. The flow through the flow tube 16 is controlled by having an outlet orifice 22 at the aft end of the flow tube. There is an opening 24 between the flow channel 18 and an aft branch flow channel 27 which opens to the hollow strut, which forms a branch flow channel 26.

Liquid water is represented by the dashed lines 28, and the flow housing 12 provides inertial separation of the liquid moisture so that little of the liquid water passes into the branch flow channel 26. The branch flow channel 26 has an exhaust opening 30 at its rear or downstream side. This type of a flow housing is used in various temperature sensors, and for example is of the type shown in U.S. Pat. No. 2,970,475 for a gas temperature probe.

In the present invention, the flow housing 12 mounts temperature sensing probes for determining presence of icing conditions, and in this form of the invention, a probe indicated at 34 is mounted in the branch flow channel 27 of flow tube 16, so that the freestream liquid moisture laden air impinges on the probe 34. Any liquid moisture impinging on the probe 34 will affect the power needed for heating or self-heating the probe, assuming it is desired to maintain the probe at constant temperature.

A second temperature sensing probe 38 is mounted in the branch flow channel 26, the flow in which branch channel is essentially free of liquid water, so the airflow across probe 38 is and remains substantially the same as dry, non-liquid water carrying air.

Since the detector must operate in icing environments the detector housing is provided with heaters 35, preferably electrical, to prevent ice build-up. Heaters 35, for example, may be routed internally within the walls of the housing 12 or applied as a mat in a fashion similar to that currently done with many devices that must be ice protected such as temperature probes, pressure probes and antennae.

To prevent deicing heat from significantly influencing the probes within the housing 12, the flow tube, 16, is provided with a number of small holes or perforations 36, to bleed off the heated boundary layer that forms at the inside walls. This technique is currently used in some aircraft total temperature sensors for the same purpose.

A baffle or heat shield 37, is positioned in flow channel 26, to further minimize the influence of deicing heaters located in the forward walls of strut 14, or probe(s) located within flow channel 26. An orifice, 39, provides venting between the baffle 37 and the inner surface of the forward wall of the strut to prevent excessive temperature rise of the baffle wall.

As shown in FIG. 2, where in the schematic diagram the resistances of probe 34 indicated as P1, and probe 38, indicated as P2, are coupled into legs of a bridge circuit 40. Resistors R1, also indicated at 42, and R2, also indicated at 43, are coupled into the bridge and when the air in both of the branch flow channels 26 and 27 is essentially dry, and balanced to be substantially equal flow rates, the resistances of probes P1 and P2 (34 and 38) will react substantially the same and the bridge will remain balanced. This is indicated by the ratio P1/P2=R1/R2.

The voltage source 46, designated $V_{supply}$, excites the bridge. The output of the bridge is across the opposite terminals from the input, and is designated $V_b$ in FIG. 2. This output signal is provided to an air data computer 50. It should also be noted that bridge resistors R1 and R2 are selected to be substantially greater than the resistances of P1 and P2 to minimize heating of R1 and R2. The computer 50 is provided with an air temperature signal from a temperature sensor or source indicated at 54 and this air temperature signal source can be a separate sensor mounted on the aircraft, or as will be explained in connection with FIGS. 3 and 4, can be an additional probe mounted in the flow housing 12. The sensor or source 54 provides freestream of ambient temperature.

When moisture is such as that indicated by the lines 28 in flow channels 18 and 27 in FIG. 1, is present in the freestream air flow, the probe 34 (P1) will experience liquid moisture impingement, whereas little or no liquid moisture will impinge on probe 38 (P2). Probes 34 and 38 are electrically self-heated to a temperature in the range of 50 degrees to 100 degrees C. above ambient.

As an alternative to self-heating, separate heater elements integral with, or in close proximity to, the temperature sensing elements in the probes 34 and 38 can be used. The mass flow rate of flow stream in the branch channels 26 and 27 is controlled by regulating the size of outlets 22 and 30, as well as the size of opening 24 so that the mass flow is substantially the same over each of the probes 34 and 38.

In a non-moisture situation, there will be more heat removed from each probe as the flow rate increases, but the amount of heat removed from each will be substantially the same. The bridge 40 will remain substantially balanced. Thus, the output voltage designated $V_b$ is independent of the flow rate or air speed.

If, however, there is liquid moisture present in the freestream airflow in branch channel 27, the heat removed from the probe 3A (P1) is enhanced by evaporation and/or blow-off of warmed water since the probes are maintained at a temperature significantly above ambient. This results in a probe temperature change at probe 34 and a resistance change in the probe, and consequently an offset or change in output signal voltage $V_b$. The offset in $V_b$ increases with increasing liquid water content at the same mass flow of air. There is sensitivity to frozen precipitation such as snow and ice crystals but this sensitivity will be relatively low, and will appear in the form of output voltage spikes that can be filtered by signal conditioning prior to providing the output signal to computer 50, or filtering can be done in the computer 50.

The temperature measurement from the temperature sensor or signal source 54 is combined with the output of the bridge 40, so that the computer provides an output that indicates icing conditions. Icing conditions are indicated when the temperature T is slightly above freezing or less, and when a voltage output from the bridge circuit 40, is caused by liquid moisture being present in branch channel 27 and impinging on probe 34.

Figure 3:
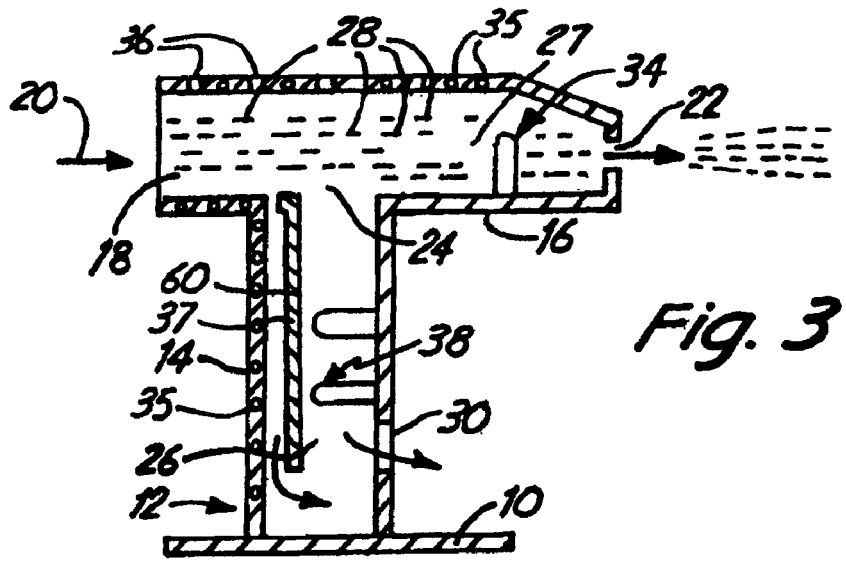
FIG. 3 is a sectional view through a flow housing having branched flow channels showing probes of a second alternative form of the invention.
Figure 4:
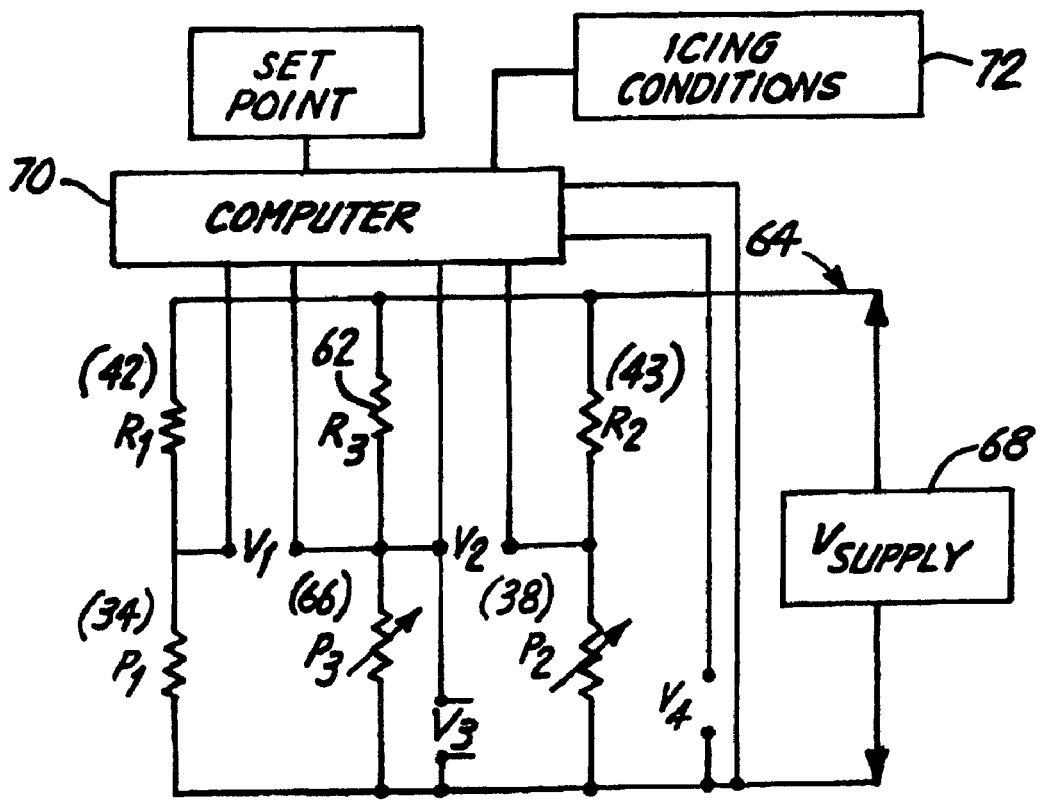
FIG. 4 is a schematic bridge circuit utilizing the probe arrangement shown in FIG. 3.

In FIGS. 3 and 4, an alternative form of the invention is shown. Probes 34 (P1) and 38 (P2), are positioned the same as in FIG. 1, but an optional temperature sensing probe 60 is provided in the branch flow channel 26. Probe 60 preferably is positioned upstream of the probe 38 (P2) to avoid heating influences from the probe 38, which as stated is held above ambient temperature. The resistance of probe 60 (P3) and a resistor 62 that is shown connected into an alternative bridge circuit 64 are chosen to be at least an order of magnitude greater than the resistances of probes 34 and 38 (P1 and P2). This selection or resistances will significantly limit self-heating effects.

The resistance element in probe P3 is in the leg of a bridge circuit 64 that is shared by heated probes P1 and P2, as shown in FIG. 4. This bridge arrangement affords two bridge voltage outputs, designated $V_1$ and $V_2$ in FIG. 4. The output $V_1$ indicates the change in resistance that occurs in moisture laden or water laden air in branch flow channel 27, and $V_2$ is an output that is indicative of the resistance of the probe in the branch flow channel 26, where moisture has been separated.

The arrangement of FIGS. 3 and 4 reduces the dependency of determining mass flow rate, or making the mass flow rates equal over the probes 34 and 38 as shown in FIG. 1, because there is an independent measurement of heat loss from probes located in flow branch channels 27 and 26. There is a known relationship between $V_1$ and $V_2$ as a function of dry airflow rate. Furthermore, dry air mass flow rate can be discerned from voltage $V_4$ across the heated probe 38 in the dry air channel, 26, and $V_3$, the voltage drop across the temperature sensing probe 60, also in dry air channel 26. With moisture laden air in the channel 18, the relationship between $V_1$ and $V_2$ will be different because of additional heat losses at probe 34 (P1) from evaporation and/or blow-off since the branch channel 27 carries the liquid moisture, while branch channel 26 carries air with little or no liquid moisture. Therefore, if the voltage relationship between $V_1$ and $V_2$ changes, from the expected relationship with dry air in both branch flow channels, the presence of liquid moisture in branch flow channel 27 is indicated.

Voltage source $V_{supply}$ and voltage $V_3$ shown in FIG. 4, can be measured and provided to a computer 70, to determine the ambient air temperature. Temperature and moisture information is thus available to determine the presence of icing conditions as an output 72 from the computer 70. The computer is provided with a set point signal so that when liquid moisture is sensed to be present and the measured air temperature is below the set point, icing conditions are indicated.

It is to be noted that any type of inertial separation flow path can be utilized, and the structure shown herein is merely an example of the type that could be used. The change in direction of a flow can be caused by baffles, obstructions such as posts that cause diversion of particles, and various other shapes and forms of channels that have flow paths branching at a sufficient angle such that the heavier particles will continue in their flow direction under inertial forces and the branch path or bleed path will carry airflow that is substantially free of any liquid moisture particles.

The ability to provide orifices or other flow controls such as the outlets 22 and 30 in FIG. 1 for exhaust of fluids, is a way of ensuring that the mass flow rates in the separated channels are substantially the same, and yet inertial separation will keep the liquid particles moving in the same direction along in the straight flow path through branch channel 27.

In FIG. 4, the quantity R1/P1 approximately equal to R3/P3 and is approximately equal to R2/P2. Also $R_3$ is substantially greater than $R_1$, and $R_1$ is substantially equal to $R_2$ in order to have the bridge perform satisfactorily.

Figure 5:
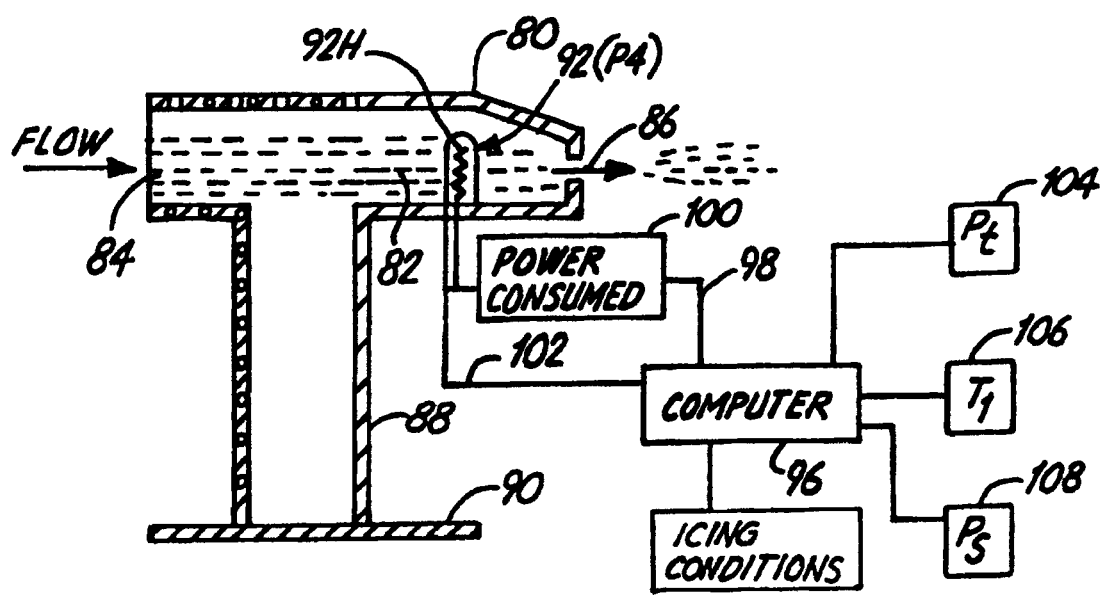
FIG. 5 is a sectional view of a flow housing mounting a single probe directly in the liquid moisture carrying airflow.

In FIG. 5, a flow housing 80 is illustrated, and is of substantially the same form as the flow housing 12 and strut 14, but in this instance, the flow tube 81 forms a flow channel directly from a flow inlet 84 and through a control orifice 86 at the outlet. A strut 88 is used for supporting the flow housing 80 relative to an aircraft skin 90, and in this instance, the strut opening does not carry flow and is a hollow pipe that has no flow outlet for exiting air. The strut could be solid, in other words, in this form of the invention.

A probe indicated at 92 and which can be represented as $P_4$ is a heated, or self-heated temperature sensitive probe that is deployed in the airstream, and there is no special ducting required. A flow housing for providing ducting is preferred particularly to control airflow over the probe, to minimize probe operating power and to protect the probe, although the probe can protrude directly into an airstream so long as the liquid water is not separated from the airstream in which the probe is mounted.

In this form of icing conditions detector, the operation of the probe 92 is based upon the well known fact that power consumed by a heated body maintained at a constant temperature above ambient of the airstream is a function of the mass flow rate. It is desired to maintain the body, in this case the probe 92, at a fixed temperature above ambient. Power consumed in a dry environment will have a fixed relationship to the mass flow rate calculated from the air data information available from another source.

Probe 92, which again is self-heated or with a separate heater that is shown schematically at 92H in FIG. 5, is connected to a computer 96 with a controlled power source, and the computer provides power to the heater or the self heating resistor along a line 98, and through a "power consumed" indicator 100, which essentially is the power input to the probe 92. The computer will measure the power that is drawn to maintain the temperature of the probe 92. This power consumed signal provided along a line 102 back to the computer 96 and is maintained at a desired level.

In order to provide the data or information necessary to determine the mass flow rate, a pitot (total) pressure input 104, a total air temperature input 106, and a static pressure input 108 can be used to calculate the mass flow rate, and provide the known parameters to the computer 96 for determining the power that would be consumed at the existing mass flow rate if the probe 92 is in dry air. Then, using the actual power consumed from the indicator 100, the computer provides an indication when moisture is present in the airflow. The amount of moisture can also be determined by empirical tests, or calculations that are related to the particular probe 92, and what power this probe consumes or requires to maintain a selected temperature in airflow having liquid moisture conditions at different mass flow measurement rates.

Again, to assess icing conditions, a measurement of temperature from a temperature sensor 106, providing a temperature parameter to a computer system is necessary. Temperature sensing is well known in aircraft, and air data sensors.

The effect of water vapor, that is, humidity, in the airflow will have little influence on performance of the detector of the present invention. The detectors are very sensitive, however, to the presence of water droplets, that is liquid water in the air. It is also recognized that the heat transfer capability of air is not only a function of mass flow rate, but also temperature. Compensating for temperature, if necessary, can be done by suitable analytical techniques that would provide information to a control computer, or direct compensation in the circuitry by having temperature dependent circuit elements. The ability to provide these compensation techniques are presently done in existing mass flow measurement products.

Although the present invention has been described with reference to preferred embodiments, workers skilled in the art will recognize that changes may be made in form and detail without departing from the spirit and scope of the invention.

What is claimed is:

1. A method of indicating the presence of liquid moisture in an airflow, comprising:
   providing an indicator of actual power consumed by a heated probe in a portion of an airflow that includes liquid moisture content;
   sensing an airflow rate in the airflow with a pitot pressure sensor;
   sensing static pressure in the airflow;
   sensing total air temperature in the airflow;
   calculating in a computer, as a function of the sensing of the airflow rate, the static pressure and the air temperature, an amount of power that would be consumed by the heated probe in a dry airflow; and
   coupling the computer to the indicator of actual power consumed, the computer providing an output indicating the presence of liquid moisture in the airflow when the indicator of the actual power consumed by the heated probe deviates from the amount of power that would be consumed by the heated probe in a dry airflow.

2. The method of claim 1 and providing power from the computer through the indicator of actual power consumed to the heated probe.

3. The method of claim 1 and maintaining the actual power consumed at a desired level with the computer.

4. The method of claim 1 and computing a mass flow rate with the computer as a function of the sensed total air temperature, the sensed pitot pressure and the sensed static pressure.

5. The method of claim 4 and determining an amount of power that would be consumed at the computed mass flow rate with the computer.

6. The method of claim 1 and the computer providing an output indicating the presence of liquid moisture in the airflow at ambient temperatures that are above freezing.

7. The method of claim 1,
wherein the heated probe is self-heated with power used to excite a sensor element in the heated probe.

8. The method of claim 1, wherein the computer indicates the presence of moisture when the actual power consumed deviates from the amount of power that would be consumed by the heated probe in a dry airflow when a measured air temperature is below a set point.

9. The method of claim 1,
wherein the heated probe is maintained at a fixed temperature.

10. The method of claim 1, wherein the heated probe is part of a bridge circuit.

11. The method of claim 1, wherein the heated probe is mounted in a branch flow channel of a flow tube, the branch flow channel carrying the portion of the airflow that includes liquid moisture content.

12. The method of claim 11, wherein the branch flow channel is provided with perforations to bleed off a boundary layer along the walls of the flow tube.

13. A method of indicating the presence of liquid moisture in an airflow, comprising:

providing an indicator of actual power consumed by a heated probe in a portion of an airflow that includes liquid moisture content;
sensing total pressure in the airflow with a pitot pressure sensor;
sensing static pressure in the airflow;
sensing total air temperature in the airflow;
calculating in a computer, as a function of the sensing of the total pressure, the static pressure and the air temperature, an amount of power that would be consumed by the heated probe in a dry airflow; and
coupling the computer to the indicator of actual power consumed, the computer providing an output indicating the presence of liquid moisture in the airflow when the indicator of the actual power consumed by the heated probe deviates from the amount of power that would be consumed by the heated probe in a dry airflow.

14. The method of claim 13 and providing power from the computer through the indicator of actual power consumed to the heated probe.

15. The method of claim 13 and maintaining the actual power consumed at a desired level with the computer.

16. The method of claim 13 and computing a mass flow rate with the computer as a function of the sensed total air temperature, the sensed pitot pressure and the sensed static pressure.

17. The method of claim 16 and determining an amount of power that would be consumed at the computed mass flow rate with the computer.

18. The method of claim 13 and the computer providing an output indicating the presence of liquid moisture in the airflow at ambient temperatures that are above freezing.

19. The method of claim 13,
wherein the heated probe is self-heated with power used to excite a sensor element in the heated probe.

20. The method of claim 13, wherein the computer indicates the presence of moisture when the actual power consumed deviates from the amount of power that would be consumed by the heated probe in a dry airflow when a measured air temperature is below a set point.

* * * * *